(12) United States Patent
Guo et al.

(10) Patent No.: US 11,353,384 B2
(45) Date of Patent: Jun. 7, 2022

(54) APPARATUS FOR TESTING TANGENTIAL AND NORMAL RESISTANCE OF ANCHOR CHAIN AND SOIL UNDER EQUIVALENT ELASTIC BOUNDARY

(71) Applicant: ZHEJIANG UNIVERSITY, Hangzhou (CN)

(72) Inventors: Zhen Guo, Hangzhou (CN); Lizhong Wang, Hangzhou (CN); Shengjie Rui, Hangzhou (CN); Yi Hong, Hangzhou (CN); Lingling Li, Hangzhou (CN); Yujie Li, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 0 days.

(21) Appl. No.: 16/960,896

(22) PCT Filed: Sep. 10, 2019

(86) PCT No.: PCT/CN2019/105107
§ 371 (c)(1),
(2) Date: Jul. 9, 2020

(87) PCT Pub. No.: WO2020/057396
PCT Pub. Date: Mar. 26, 2020

(65) Prior Publication Data
US 2021/0364401 A1 Nov. 25, 2021

(30) Foreign Application Priority Data

Sep. 20, 2018 (CN) .......................... 201811118520.7

(51) Int. Cl.
*G01N 3/12* (2006.01)
*G01N 3/24* (2006.01)
(Continued)

(52) U.S. Cl.
CPC ................. *G01N 3/08* (2013.01); *G01N 3/06* (2013.01); *G01N 2203/0017* (2013.01); *G01N 2203/0019* (2013.01); *G01N 2203/0044* (2013.01)

(58) Field of Classification Search
CPC .. G01N 3/12; G01N 3/08; G01N 3/02; G01N 3/24; G01N 3/06; G01N 2203/0017;
(Continued)

(56) References Cited

U.S. PATENT DOCUMENTS 6,752,019 B2 * 6/2004 Horiuchi ............... G01M 7/025
702/33
2009/0000361 A1 * 1/2009 Bloomquist ............. G01N 3/24
73/86

FOREIGN PATENT DOCUMENTS

| CN | 104614231 A | 5/2015 |
| CN | 204988889 U | 1/2016 |

(Continued)

OTHER PUBLICATIONS

Study of Influencing Factors on Interaction between Soil and Anchor Chain in Deep Sea by FEM; Nov. 30, 2015.
(Continued)

*Primary Examiner* — Brandi N Hopkins
(74) *Attorney, Agent, or Firm* — W&G Law Group

(57) ABSTRACT

An apparatus for testing tangential and normal resistance of an anchor chain and soil under an equivalent elastic boundary and a method therefor, and the apparatus includes a support frame, a transmission device (4), an air pressure loading system, a test box (5), a vertical displacement applying part (6), a tangential anchor chain unit (7), a normal anchor chain unit (8), etc. The present disclosure can, by using a spring of equal stiffness to simulate the elastic boundary and being capable of overcoming an influence of boundary conditions, greatly reduce a size of the test box, (Continued)

thereby effectively saving materials and reducing difficulty of a test operation; moreover, it integrates the normal and tangential resistance tests into one, which can measure tangential and normal interactions of the anchor chain and the soil at the same time.

8 Claims, 3 Drawing Sheets

(51) Int. Cl.
    *G01N 3/08*     (2006.01)
    *G01N 3/06*     (2006.01)

(58) Field of Classification Search
    CPC .... G01N 2203/0019; G01N 2203/0044; E02D 5/80; G01L 5/00; G01C 21/18; G09B 25/00
    See application file for complete search history.

(56) References Cited

FOREIGN PATENT DOCUMENTS

| CN | 106092416 | A | | 11/2016 | | |
|---|---|---|---|---|---|---|
| CN | 107505206 | A | | 12/2017 | | |
| CN | 109030182 | A | * | 12/2018 | ............. | E02D 1/022 |
| CN | 109374418 | A | | 2/2019 | | |
| IN | 201611022643 | A | | 1/2018 | | |
| KR | 101653750 | B1 | | 9/2016 | | |

OTHER PUBLICATIONS

International Search Report (PCT/CN2019/105107 ); dated Dec. 10, 2019.

\* cited by examiner

APPARATUS FOR TESTING TANGENTIAL AND NORMAL RESISTANCE OF ANCHOR CHAIN AND SOIL UNDER EQUIVALENT ELASTIC BOUNDARY

TECHNICAL FIELD

The present disclosure relates to a test device, and in particular, to an apparatus for testing tangential and normal resistance of an anchor chain and soil under an equivalent elastic boundary, and the apparatus can measure resistance when the anchor chain and the soil displace relative to each other in tangential and normal directions under different strata stress elastic boundaries.

BACKGROUND

In the field of marine engineering, anchoring foundations and anchor chains are usually used to fix offshore floating structures (such as offshore drilling platforms, exploration platforms, etc.), and currently the most widely used one is a suction anchor, such an anchoring foundation usually has a certain buried depth to improve a force bearing state of the anchor so as to exert a greater bearing capacity, and a connection point with the anchor chain is usually located at ⅔ of the buried depth of the anchoring foundation, so the anchor chain needs a certain soil-embedding depth.

Existing studies believe that a magnitude of a load transferred from an upper load to the anchoring foundation is mainly related to tangential shear of the anchor chain and the soil, while a shape of a mooring line is mainly related to a magnitude of the normal resistance. A magnitude of an acting force transmitted from an upper structure to a position of an anchor eye through the anchor chain determines force bearing and failure modes of the foundation, which in turn affects safety of an entire mooring system. At present, there is no relevant test apparatus at home and abroad that can measure normal and tangential shear resistance of the anchor chain and the soil at the same time, especially in term of the testing of the normal resistance, which often needs to consider a size effect of the elastic boundary, so a size of a test box needs to be made large enough. This test apparatus can fill a gap in the technical field and provide important design parameters for calculation of a soil-embedding section of an engineering anchor chain.

SUMMARY

An object of the present disclosure is to provide an apparatus for testing tangential and normal resistance of an anchor chain and soil under an equivalent elastic boundary, which can measure the tangential and normal resistance of the anchor chain and the soil under the elastic boundary, filling a gap in calibration of the anchor chain and the soil unit test. Characteristics of the apparatus are: pressurizing the soil in the test by an airbag to simulate an original stress state of the soil; applying a round-trip load by a servo motor of a transmission device to measure tension of the anchor chain during the test, thereby measuring the tangential resistance of the anchor chain and the soil; applying a vertical load by a stepper motor of a vertical displacement applying unit to measure the normal resistance of the anchor chain and the soil during the test; and simulating the elastic boundary through springs on sidewalls and a bottom plate, in which the size of the model box can be greatly reduced by using the spring equivalent elastic boundary.

The present disclosure adopts following technical solutions.

An apparatus for testing tangential and normal resistance of an anchor chain and soil under an equivalent elastic boundary, includes a support frame, a test box, a transmission device, an air pressure loading system, a vertical displacement applying unit, a tangential anchor chain unit, and a normal anchor chain unit. The test box is fixed on the support frame and formed by fixedly connecting a bottom plate, a front wall, a rear wall, a left fixing plate, a right fixing plate, and a detachable top plate. An airbag, a sliding top plate, a soil sample, and a sliding bottom plate are sequentially arranged under the top plate in the test box. A sliding front wall, the soil sample, and a sliding rear wall are sequentially arranged behind a front sidewall in the test box. The sliding bottom plate and the bottom plate are connected by springs, the sliding front wall and the front wall are connected by springs, and the sliding rear wall and the rear wall are connected by springs. A linear bearing sleeve is installed in each of holes arranged on the left fixing plate and the right fixing plate, built-in linear bearing guide rods are connected to two ends of the tangential anchor chain unit buried in the soil sample by hooks, and the transmission device is connected with the linear bearing guide rods. The vertical displacement applying unit penetrates the top plate, the airbag and the sliding top plate and to be directly connected to the normal anchor chain unit, and is configured to apply a vertical displacement to an entire of the normal anchor chain unit. The air pressure loading system is configured to regulate pressure inside the airbag.

In the above technical aspect, furthermore, the transmission device includes four fixed pulleys, a servo motor, a steel strand and two force sensors, the four fixed pulleys are fixed on the support frame and respectively disposed, two by two, on a left side and a right side of the test box, the steel strand is sequentially winded around the four fixed pulleys, and has one end connected to one of the two force sensors to be connected to one of the linear bearing guide rods, and the other end connected to the other one of the two force sensors to be connected to another one of the linear bearing guide rods, and the servo motor is connected to the steel strand and configured to apply a displacement.

Furthermore, the air pressure loading system includes an air tube, a barometer and an air pressure regulating system, the airbag is connected to the air pressure regulating system through the air tube, and the barometer is provided on the air tube.

Furthermore, the vertical displacement applying unit includes a reaction beam fixed on the support frame, a stepper motor fixed with the reaction beam, and a guide rod; the stepper motor is connected to the guide rod, the guide rod and the normal anchor chain unit are connected to each other, and the guide rod is provided with a vertical force sensor.

Furthermore, the tangential anchor chain unit includes five single-chain rings.

Furthermore, single-chain rings of the normal anchor chain unit are welded together.

Tangential Resistance 1) first, friction of the transmission device and a loading device is calibrated by replacing a tangential anchor chain with a steel strand as $T_1$, which include:

applying a pre-tension load of 1 kN through the servo motor, in such a manner that the steel strand in the test box is tensioned and straightened;

arranging the soil sample based on test requirements in such a manner that the soil sample is controlled to have a specified compactness, and then installing a slidable top plate, the airbag, and the top plate, and fixing the top plate on a left sidewall and a right sidewall through fixing latches;

applying pressure to the airbag in such a manner that pressure inside the airbag is controlled to reach a specified value for consolidation; and applying a prescribed displacement by the servo motor, measuring force by a left force sensor and a right force sensor, wherein readings of the left force sensor and the right force sensors are respectively recorded as $f_1$ and $f_2$, then $T_1 = |f_1 - f_2| = f_{between\ the\ steel\ strand\ and\ the\ soil} + f_{inherent\ friction\ of\ a\ system}$, and friction between the steel strand and the soil is ignorable due to a small diameter of the steel strand.

2) Test of the tangential resistance of the anchor chain and soil is performed, which includes:

replacing the steel strand with the tangential anchor chain unit, performing remaining steps same as those comprised in the step 1), connecting pulleys and the steel strand together properly, and applying the pre-tension load of 1 KN by the servo motor in such a manner that the tangential anchor chain in the test box is tightened and straightened;

arranging the soil sample based on test requirements in such a manner that the soil sample is controlled to have a specified compactness, and then installing the slidable top plate, the airbag, and the top plate and fixing the top plate on the left sidewall and the right sidewall through the fixing latches;

applying pressure to the airbag in such a manner that control the pressure inside the airbag is controlled to reach a specified value for consolidation; and applying a prescribed displacement by the servo motor, and measuring force by the left force sensor and the right force sensor, wherein readings of the left force sensor and right force sensor are respectively recorded as $F_1$ and $F_2$, and the tangential resistance of the anchor chain and the soil is be measured as $F_\tau = |F_1 - F_2| - T_1 = |F_1 - F_2| - |f_1 - f_2|$.

Normal Resistance 1) a normal anchor chain unit is connected to a guide rod and a stepper motor and driven to move at a constant speed by the stepper motor, reading of a force sensor is read out and denoted as $T_2$ that is gravity of the anchor chain and part of the guide rod, which include:

arranging a soil sample based on test requirements in such a manner that the soil sample is controlled to have a specified compactness, and then installing a slidable top plate, the airbag, and the top plate and fixing the top plate through fixing latches.

applying pressure to the airbag through an air compressor in such a manner that the pressure inside the airbag is controlled to reach a specified value for consolidation; and applying a normal displacement by the stepper motor at a certain rate, recording a reading of the force sensor as $F_3$, and calculating the normal resistance of the anchor chain and the soil by taking gravity of the anchor chain and the guide rod into account, where $F_n = T_2 + F_3$.

The present disclosure proposes the apparatus for testing the tangential and normal resistance of the anchor chain and the soil, which can, by using the spring of equal stiffness to simulate the elastic boundary and being capable of overcoming an influence of boundary conditions, greatly reduce the size of the test box, thereby effectively reducing difficulty of a test operation. Moreover, it integrates the normal and tangential resistance tests into one, which can simulate tangential and normal interactions of the anchor chain and the soil under different crustal stress elastic boundary conditions, has more perfect functions, can provide test parameters for a model of the interaction between the engineering anchor chain and the soil, and has important reference significance for design of the mooring system (especially when being related to a middle section of the soil).

Figure 1:
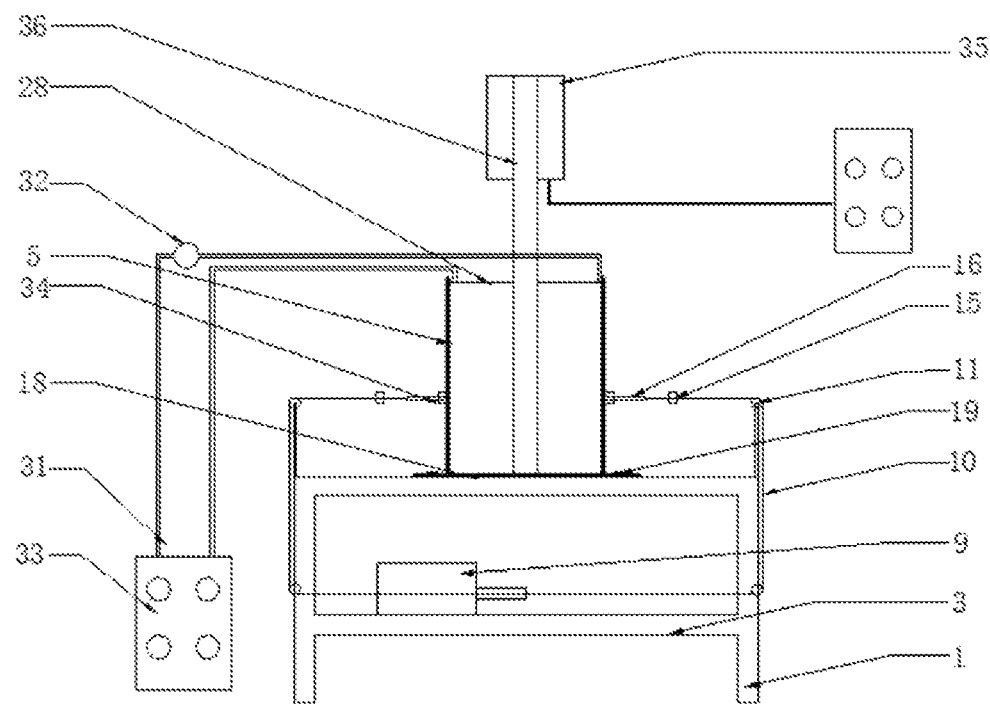
FIG. 1 is a front view of a specific structure of an apparatus according to the present disclosure.

In the drawings: support frame column 1; upper countertop 2; lower countertop 3; transmission device 4; test box 5; vertical displacement applying part 6; tangential anchor chain unit 7; normal anchor chain unit 8; servo motor 9; steel strand 10; pulley 11; supporting rod 12; pulley bracket 13; guide rod 14; force sensor 15; linear bearing guide rod 16; hook 17; bottom plate 18; bottom plate fixing bolt 19; spring 20; sliding bottom plate 21; front and rear walls 22; sliding front and rear walls 23; sidewall hole 24; sliding top plate 25; sliding top plate hole 26; airbag 27; top plate 28; top plate hole 29; fixing latch 30; air tube 31; high-precision barometer 32; air pressure regulating system 33; linear bearing sleeve 34; stepper motor 35; reaction beam 36.

DESCRIPTION OF EMBODIMENTS

Figure 2:
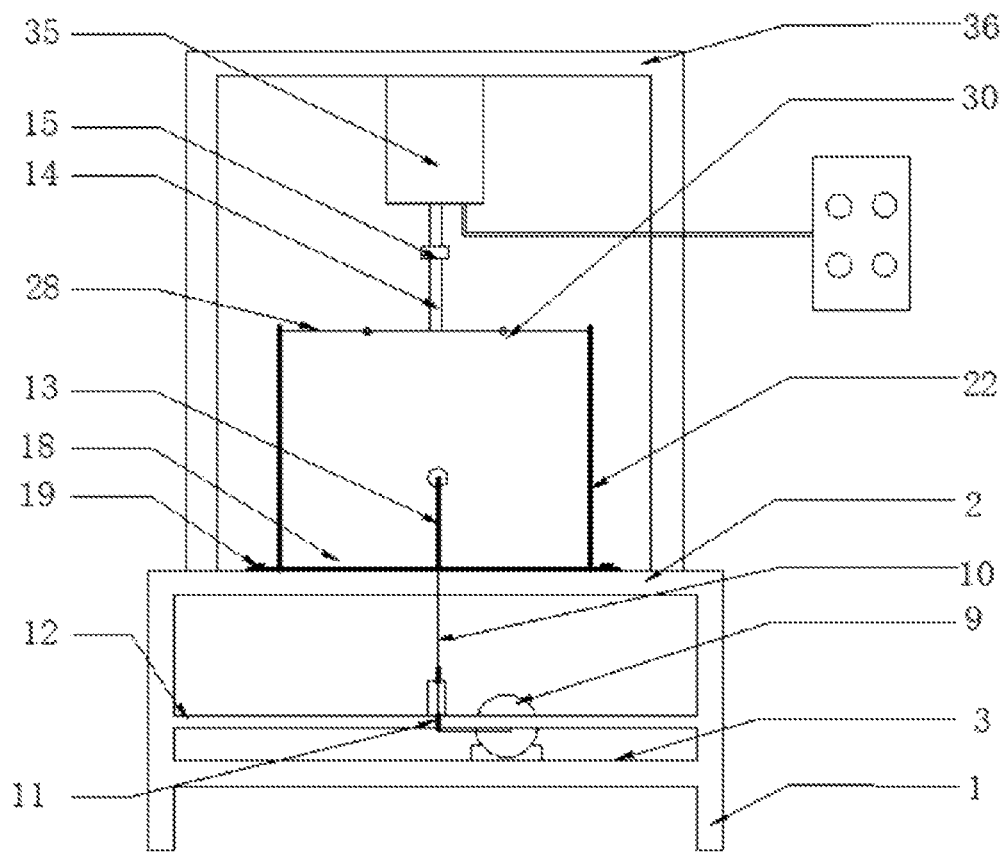
FIG. 2 is a side view of a structure shown in FIG. 1 according to the present disclosure.
Figure 3:
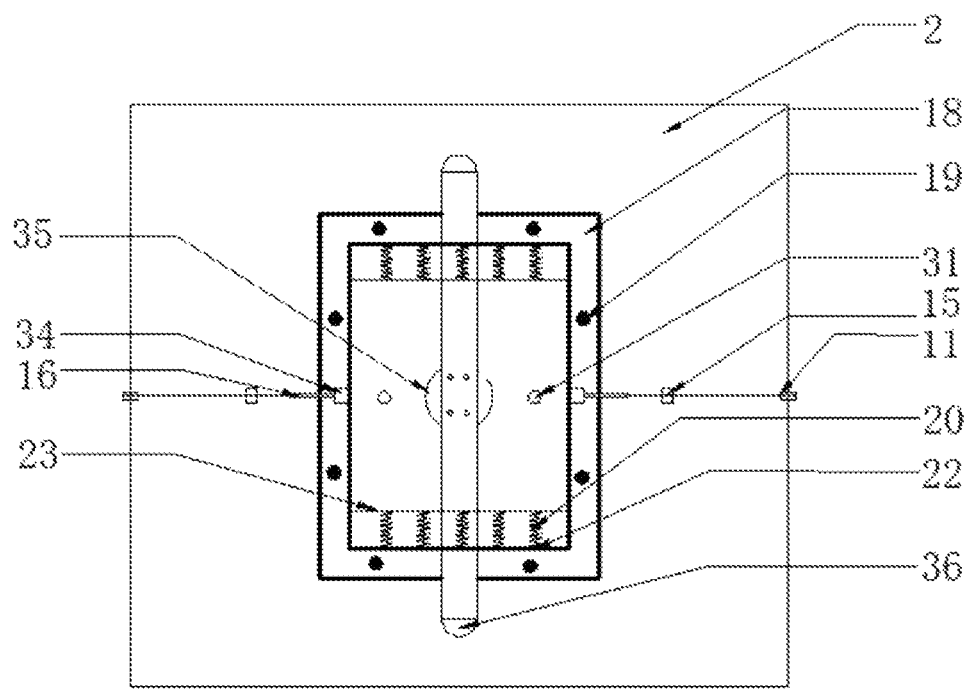
FIG. 3 is a top view of a structure shown in FIG. 1 according to the present disclosure.
Figure 4:
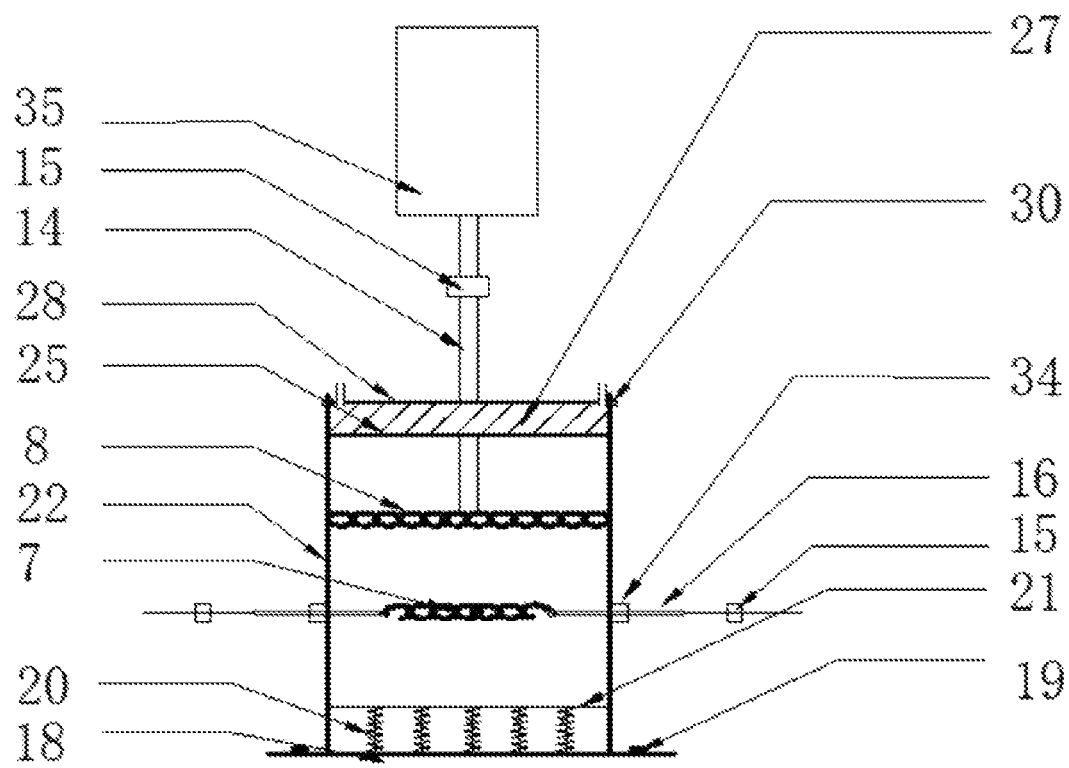
FIG. 4 is a front cross-sectional view of a specific structure of a test box.
Figure 5:
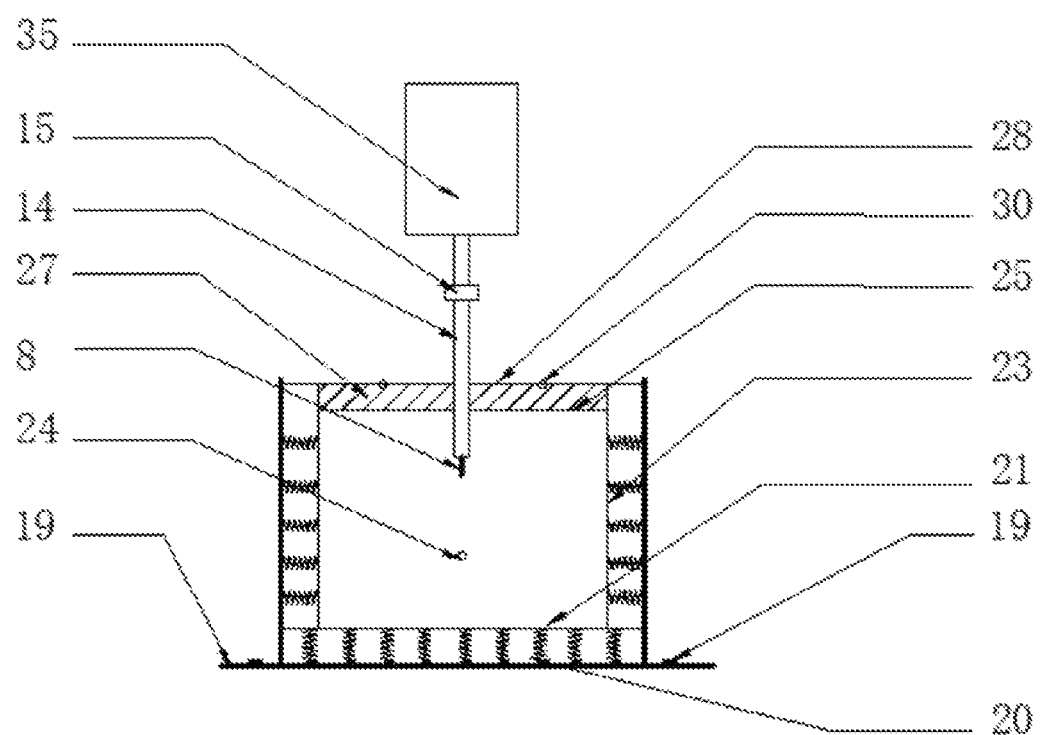
FIG. 5 is a side cross-sectional view of the test box of FIG. 4.

Referring to FIGS. 1-5, an apparatus for testing tangential and normal resistance of an anchor chain and soil under an equivalent elastic boundary according to the present disclosure includes a support frame, a test box, a transmission device, an air pressure loading system, a vertical displacement applying unit, a tangential anchor chain unit, and a normal anchor chain unit. The test box is fixed on the support frame and formed by fixedly connecting a bottom plate, a front wall, a rear wall, a left fixing plate, a right fixing plate and a detachable top plate. An airbag, a sliding top plate, a soil sample, and a sliding bottom plate are sequentially arranged under the top plate in the test box, and a sliding front wall, the soil sample, and a sliding rear wall are sequentially arranged behind a front sidewall in the test box. The sliding bottom plate and the bottom plate are connected by springs, the sliding front wall and the front wall are connected by springs, and the sliding rear wall and the rear wall are connected by springs. A linear bearing sleeve is installed in each of holes arranged on the left fixing plate and the right fixing plate, built-in linear bearing guide rods are connected, by hooks, to two ends of a tangential anchor chain unit buried in the soil sample, and the transmission device and the linear bearing guide rod are connected to each other; the vertical displacement applying unit penetrates the top plate, the airbag and the sliding top plate and to be directly connected to the normal anchor chain unit, and is configured to apply a vertical displacement to an entire of the normal anchor chain unit. The air pressure loading system is configured to regulate pressure inside the airbag.

In the illustrated embodiment, the support frame includes a support frame column 1, an upper countertop 2, and a lower countertop 3. The transmission device 4 includes a servo motor 9, a steel strand 10, four fixed pulleys 11, a supporting rod 12, a pulley bracket 13, and two force sensors 15. The vertical displacement applying part includes a guide rod 14, a force sensor 15, a stepper motor 35, and a reaction beam 36. The stepper motor 36 applies a displacement to the normal anchor chain unit 8 through the guide rod 14, to measure the normal resistance. The test box 5 of the present disclosure has an outer wall formed by a bottom plate 18, a front wall, a rear wall, a left fixing plate, and a right fixing plate, and is fixed to a middle part of the upper countertop 2 through a bottom plate fixing bolt 19 and provided with a top plate 28 on the top thereof. Under the top plate 28, an airbag 27, a sliding top plate 25, a test soil sample, a sliding bottom plate 21, a spring 20, and a bottom plate 18 are provided in sequence. The test box 5 is provided with sidewall holes 24 on left and right side-surfaces, and linear bearing sleeves 34 are provided on the left fixing plate and the right fixing plate. One end of the linear bearing guide rod 16 is connected to the transmission device such as the steel strand 10, and the other end of the linear bearing guide rod 16 is connected to a hook 17 so as to be connected to the tangential anchor chain unit 7. The transmission device 4 transmits the displacement applied by the servo motor 9 to the anchor chain and monitors the resistance through the force sensor 15. The test box 5 sequentially includes, from front to back, the front wall, the spring 20, the sliding front wall 23, the test soil sample, the sliding rear wall 23, spring 20, and the rear wall 22. The airbag 27 is connected to a high-precision barometer 32 and an air pressure control system 33 through air tubes 31, so that a certain load can be applied to the test soil sample to simulate actual crustal stress of the soil, so as to measure interaction between the soil and the anchor chain in cases of different crustal stresses under an elastic boundary. The tangential anchor chain unit 7 generally have five single-chain rings. Too few chain rings will result in inaccurate measurement, and too many chain rings will have higher requirements on test instruments. The single-chain rings of the normal anchor chain unit 8 are welded as a whole, and a length can be a distance between the left sidewall and the right sidewall 22, which can be considered as a plane strain problem.

A Test Process:

Tangential Resistance

1) First, friction of the transmission device and the loading device is calibrated by replacing the tangential anchor chain with the steel strand as $T_1$.

A pre-tension load of 1 kN is applied through the servo motor in such a manner that ensure that the steel strand in the test box is tensioned and straightened.

The soil sample is arranged according to the test requirements in such a manner that the soil sample is controlled to have a specified compactness, then a slidable top plate, the airbag, and the top plate are installed, and the top plate is fixed on the left sidewall and the right sidewall through the fixing latches.

Pressure is applied to the airbag in such a manner that the pressure inside the airbag is controlled to reach a specified value for consolidation.

A prescribed displacement is applied by the servo motor, forces are measured by a left force sensor and a right force sensor, and readings of the left force sensor and the right force sensor are respectively denoted as $f_1$ and $f_2$, then $T_1 = |f_1 - f_2| = f_{between\ the\ steel\ strand\ and\ the\ soil} + f_{inherent\ friction\ of\ a\ system}$. Since a diameter of the steel strand is relatively small, the friction between it and the soil can be ignored.

2) Test of the tangential resistance of the anchor chain and soil is performed.

The steel strand is replaced with the tangential anchor chain unit, the rest steps same as that in the step 1) are performed, the pulley and the steel strand are connected properly, and a pre-tension load of 1 kN is applied through the servo motor in such a manner that that the tangential anchor chain in the test box is tightened and straightened.

The soil sample is arranged according to the test requirements in such a manner that the soil sample is controlled to have a specified compactness, then the slidable top plate, the airbag, and the top plate are installed, and the top plate is fixed on the left sidewall and the right sidewall through the fixing latches.

Pressure is applied to the airbag in such a manner that the pressure inside the airbag is controlled to reach a specified value for consolidation.

A prescribed displacement is applied by the servo motor, forces are measured by the left force sensor and the right force sensor, and readings of the left force sensor and the right force sensor are respectively $F_1$ and $F_2$, from which the tangential resistance of the anchor chain and the soil can be measured as $F_\tau = |F_1 - F_2| = |F_1 - F_2| - |f_1 - f_2|$.

Normal Resistance

1) The normal anchor chain unit is connected to the guide rod and the stepper motor and driven to move at a constant speed by the stepper motor, reading of the force sensor is read out and denoted as $T_2$, which is gravity of the anchor chain and part of the guide rod.

The soil sample is arranged according to the test requirements in such a manner that the soil sample is controlled to have a specified compactness, then a slidable top plate, the airbag, and the top plate are installed, and the top plate is fixed on the left sidewall and the right sidewall through the fixing latches.

Pressure is applied to the airbag through an air compressor in such a manner that the pressure inside the airbag is controlled to reach a specified value for consolidation.

A normal displacement is applied by the stepper motor at a certain rate, a reading of the force sensor is read out and denoted as $F_3$, and the normal resistance $F_n$ of the anchor chain and the soil is calculated by taking the gravity of the anchor chain and the guide rod, that is, $F_n = T_2 + F_3$.

What is claimed is:

1. An apparatus for testing tangential and normal resistance of an anchor chain and soil under an equivalent elastic boundary, comprising:
    a support frame;
    a test box fixed on the support frame, wherein the test box is formed by fixedly connecting a bottom plate, a front wall, a rear wall, a left fixing plate, a right fixing plate, and a detachable top plate; an airbag, a sliding top plate, a soil sample, and a sliding bottom plate are sequentially arranged under the top plate in the test box; a sliding front wall, the soil sample, and a sliding rear wall are sequentially arranged behind a front sidewall in the test box; and the sliding bottom plate and the bottom plate are connected by springs, the sliding front wall and the front wall are connected by springs, and the sliding rear wall and the rear wall are connected by springs; a linear bearing sleeve is installed in each of holes arranged on the left fixing plate and the right fixing plate;
    a normal anchor chain unit;
    a tangential anchor chain unit, wherein built-in linear bearing guide rods are connected, by hooks, to two ends of the tangential anchor chain unit buried in the soil sample;
    a transmission device connected to the linear bearing guide rods;

a vertical displacement applying unit, wherein the vertical displacement applying unit penetrates the top plate, the airbag and the sliding top plate to be directly connected to the normal anchor chain unit, and is configured to apply a vertical displacement to an entirety of the normal anchor chain unit; and an air pressure loading system configured to regulate pressure inside the airbag.

2. The apparatus for testing the tangential and normal resistance of the anchor chain and the soil under the equivalent elastic boundary according to claim 1, wherein the transmission device comprises four fixed pulleys, a servo motor, a steel strand and two force sensors, wherein the four fixed pulleys are fixed on the support frame and respectively disposed, two by two, on a left side and a right side of the test box; the steel strand is sequentially winded around the four fixed pulleys, and has one end connected to one of the two force sensors to be connected to one of the linear bearing guide rods, and the other end connected to the other one of the two force sensors to be connected to another one of the linear bearing guide rods; and the servo motor is connected to the steel strand and configured to apply a displacement.

3. The apparatus for testing the tangential and normal resistance of the anchor chain and the soil under the equivalent elastic boundary according to claim 1, wherein the air pressure loading system comprises an air tube, a barometer and an air pressure regulating system, the airbag is connected to the air pressure regulating system through the air tube, and the barometer is provided on the air tube.

4. The apparatus for testing the tangential and normal resistance of the anchor chain and the soil under the equivalent elastic boundary according to claim 1, wherein the vertical displacement applying unit comprises a reaction beam fixed on the support frame, a stepper motor fixed to the reaction beam, and a guide rod, wherein the stepper motor is connected to the guide rod, the guide rod and the normal anchor chain unit are connected to each other, and the guide rod is provided with a vertical force sensor.

5. The apparatus for testing the tangential and normal resistance of the anchor chain and the soil under the equivalent elastic boundary according to claim 1, wherein the tangential anchor chain unit comprises five single-chain rings.

6. The apparatus for testing the tangential and normal resistance of the anchor chain and the soil under the equivalent elastic boundary according to claim 1, wherein adjacent single-chain rings of the normal anchor chain unit are welded together.

7. A method for testing tangential resistance of an anchor chain and soil under an equivalent elastic boundary by using the apparatus according to claim 1, comprising:

1) first, calibrating friction of the transmission device and a loading device by replacing a tangential anchor chain with a steel strand as $T_1$, which comprise:

applying a pre-tension load through a servo motor, in such a manner that the steel strand in the test box is tensioned and straightened;

arranging the soil sample based on test requirements in such a manner that the soil sample is controlled to have a specified compactness, and then installing a slidable top plate, the airbag, and the top plate, and fixing the top plate on a left sidewall and a right sidewall through fixing latches;

applying pressure to the airbag in such a manner that the pressure inside the airbag is controlled to reach a specified value for consolidation; and applying a prescribed displacement by the servo motor, measuring forces by a left force sensor and a right force sensor, wherein readings of the left force sensor and the right force sensor are respectively recorded as $f_1$ and $f_2$, then $T_1 = |f_1 - f_2| = f_{between\ the\ steel\ strand\ and\ the\ soil} + f_{inherent\ friction\ of\ a\ system}$, and friction between the steel strand and the soil is ignorable due to a small diameter of the steel strand; and 2) testing the tangential resistance of the anchor chain and the soil, comprising:

replacing the steel strand with the tangential anchor chain unit, performing remaining steps same as those comprised in the step 1), connecting pulleys and the steel strand together properly, and applying a pre-tension load by the servo motor in such a manner that the tangential anchor chain in the test box is tightened and straightened;

arranging the soil sample based on test requirements in such a manner that the soil sample is controlled to have a specified compactness, and then installing the slidable top plate, the airbag, and the top plate and fixing the top plate on the left sidewall and the right sidewall through the fixing latches;

applying pressure to the airbag in such a manner that the pressure inside the airbag is controlled to reach a specified value for consolidation; and applying a prescribed displacement by the servo motor, and measuring forces by the left force sensor and the right force sensor, wherein readings of the left force sensor and right force sensor are respectively recorded as $F_1$ and $F_2$, and the tangential resistance of the anchor chain and soil is measured as $F_\tau = |F_1 - F_2| - T_1 = |F_1 - F_2| - |f_1 - f_2|$.

8. A method for testing normal resistance of an anchor chain and soil under an equivalent elastic boundary using the apparatus according to claim 1, comprising:

connecting the normal anchor chain unit to a guide rod and a stepper motor, controlling the stepper motor to move at a constant speed, and recording a reading of a force sensor as $T_2$ that is gravity of the anchor chain and part of the guide rod;

arranging a soil sample based on test requirements in such a manner that the soil sample is controlled to have a specified compactness, and then installing a slidable top plate, the airbag, and the top plate and fixing the top plate through fixing latches;

applying pressure to the airbag through an air compressor in such a manner that the pressure inside the airbag is controlled to reach a specified value for consolidation; and applying a normal displacement by the stepper motor at a certain rate, recording a reading of the force sensor as $F_3$, and calculating the normal resistance of the anchor chain and the soil by taking gravity of the anchor chain and the guide rod into account, where $F_n = T_2 + F_3$.

* * * * *